March 31, 1964     F. R. GUSTAVSON     3,127,464
LIGHT SOURCE STANDARDIZING DEVICE
Filed Nov. 1, 1960
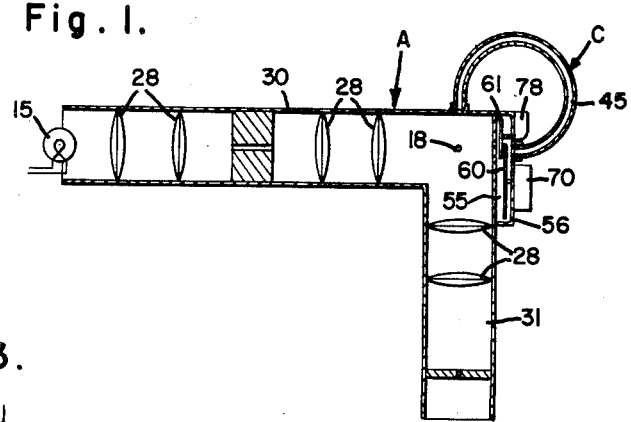
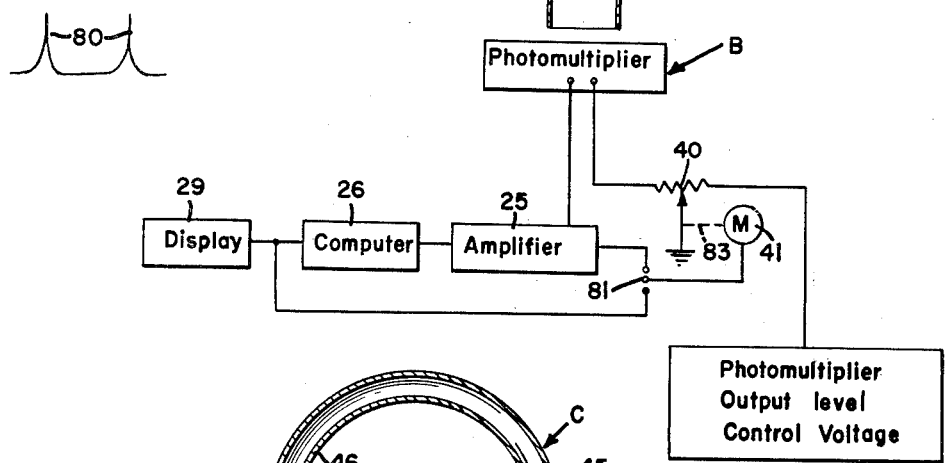
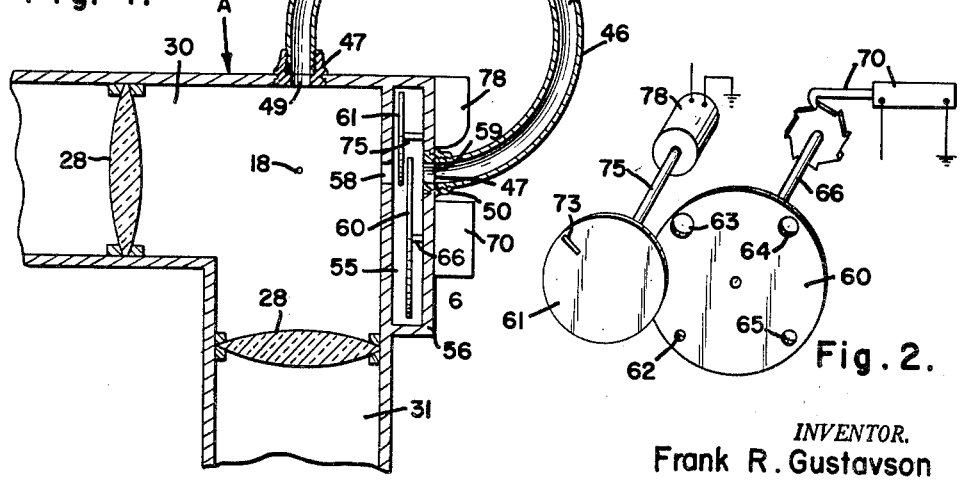
INVENTOR.
Frank R. Gustavson
BY
Townsend and Townsend
attorneys

United States Patent Office 3,127,464
Patented Mar. 31, 1964

3,127,464
LIGHT SOURCE STANDARDIZING DEVICE
Frank R. Gustavson, Palo Alto, Calif., assignor to Royco Instruments, Inc., Palo Alto, Calif., a corporation of California
Filed Nov. 1, 1960, Ser. No. 66,451
9 Claims. (Cl. 88—14)

This application is a continuation-in-part of applicant's co-pending patent application Serial No. 24,768, filed April 26, 1960, for Aerosol Particle Counter, and particularly relates to a device for standardizing and calibrating the output of devices as shown in the above identified patent application.

Optical devices, such as for example the device shown in United States Patent No. 2,732,753, to O'Konski, are frequently used to direct a light beam against a target area which contains reflective subject matter. An optical device is then arranged out of the light stream and in a position to receive the reflection from the reflective targets. Quite frequently such equipment employs a photomultiplier which records the intensity of the light reflected from a target and forms discrete pulses indicative of the number of targets in the target area. Such a device is specifically useful in counting aerosol particles where the particles are passed in a thin stream through the light beam. The path of light is then reflected to the photomultiplier where the light from each particle forms a pulse having a height proportionate to the amount of light reflected from the particle. The amount of light, of course, is proportionate to the face of the particle.

In order for the information from the photomultiplier to be intelligently useable it is necessary to form a standard and to calibrate from the standard. Therefore the pulse output from the photomultiplier of a particular height must be calibrated to a particle of a particular size. Once this is done it is quite obvious that thereafter there would be a calculated formula by which various pulse heights can be correlated to the various particle sizes. Such information is then fed to a computer like circuit where the number of particles of a predetermined size can be discretely counted and registered.

In systems of this type, however, there are a number of factors which may cause the system to drift from its standard of calibration in which case the pulse size or height would not be correlated to the basic standard of the machine. Such factors as the change of intensity of the light source for the optical device, accumulation of dirt on the optical system, a change in amplification of the photomultiplier and fluctuations of the power to the entire system are just a few of the factors which may be variable in sufficient degree to require a change of the calibration of the machine.

Previously such devices have been calibarted by running a stream of gas containing predetermined size particles through the sensing device. In such case the machine can then be calibrated to correspond with the particles of known size. This, of course, is not an entirely satisfactory means for calibration due to the fact that it is not always convenient to obtain gasses containing particles of predetermined sizes. Secondly the calibration step itself requires that the machine be put out of operation in order to effect calibration.

The principal object of this invention is to provide a novel method of calibrating a light reflecting measuring apparatus by establishing a direct conduction of light through all the elements of the optical system to the photomultiplier in such a way that the output of the photomultiplier is a result of the light conducted to it from the light source through the optics of the system. This can then function as a continuously available standard from which the machine can be calibrated.

Another object of this invention is to provide a novel shutter means in the system that conducts light from the light source to the photomultiplier. Such a shutter then functions to allow the standardizing beam of light to be restricted from passage to the photomultiplier except in instances where calibration is being checked or adjusted.

Still another object of this invention is to provide in the shutter, means to cause a sequential opening and closing of the direct light conduction to the photomultiplier and to cause the opening and closing to happen at a sufficiently rapid rate so that the light conducted to the photomultiplier will be in the form of pulses. This is a particular advantage in that most of the machines for this purpose operate from pulses rather than from steady D.C. current flow. In calibrating the machine, therefore, the machine need only be adjusted when using the conducted light to obtain pulses of a predetermined standardized height.

A still further object of this invention is to provide a novel shutter and light conducting arrangement in which light in one path is conducted through the tube and directed into another path and which further incorporates a pair of shutters interposed between one light path and the conductive tube. The shutter incorporates a novel design which allows the complete shutter to be in the off position or in the open position upon selection of a proper switch function and further allows a timed fluctuation of the light through the light conducting tube.

The novel structure affording this combination of features and advantages comprises a pair of discs each having a flat face movable over the opening between the light conducting tube and one of the passageways for light in the optical system. One of the discs or wheels is arranged with apertures which can either be aligned or misaligned with the opening to the light channel and the other of the two wheels carries a slit so that when the wheel is rotated the slit periodically passes the light passing aperture thus effecting a periodic passage of light from the conducting tube. The end optical output is thus in the form of a series of pulses during the period that the first wheel is rotated to the open shutter position.

Another feature and advantage of this invention is to form a semi-feedback or servo loop controlled by the standardizing pulse. The servo loop may be near the output or input side of the electronics of the machine so the standard can reflect and control any discrepency or change in value which occurred in any circuit between the light source to the end of the servo loop.

Other objects of the present invention will become apparent upon reading the following specification and referring to the accompanying drawings in which similar characters of reference represent corresponding parts in each of the several views.

In the drawings:

FIG. 1 is a diagrammatic view showing the air sensing device with the standardizing device of this invention attached thereto.

FIG. 2 is a diagrammatic perspective showing the relationship of the two shutter wheels.

FIG. 3 is a view showing the pulse output from the photomultiplier of FIG. 1 which is created by the pulsed light output through the light conducting tube.

FIG. 4 is an enlarged fragmentary cross-sectional view showing specific construction of the light conducting tube.

In the drawings there is provided an optical system generally indicated at A in which light from the light source 15 is directed in a focused beam to fall on a target area indicated at 18.

A photomultiplier B is arranged to receive reflected light from target area 18. The path of light between light source 15 and the target area is at 90° relative to the path of light from the target area to photomultiplier B.

The output of the photomultiplier is in the form of a series of pulses at apparently random intervals and of varying height. Each pulse is indicative of a particle passing through target area 18 and the height of the pulse, i.e., its intensity, is directly correlated to the size of the particle. Because of this analogue relationship devices of this type usually comprise digital arithmatic circuits which can calculate the particle size. In the instant device the output of the photomultiplier is directed to electronic pre-amplifier 25 which feeds a computing or arithmetic circuit 26 such as shown for example in my copending United States patent application Serial No. 24,768, filed April 26, 1960, for Aerosol Particle Counter. The output from the computer is registered on a suitable display device such as indicated at 29.

The obvious problem in the utilization of a device of this nature is that the height of a pulse emanating from the photomultiplier must be correlated with a particular particle size otherwise the information developed by the computer is valueless insofar as determining dimension of precise particle size is concerned.

Many standardizing techniques have been employed such as for example passing a gas stream through target area 18 having particles of predetermined size characteristics. This creates a standard or reference.

The actual particle counting optical system A carries numerous condensers and lenses indicated at 28 in both the light transmiting tube 30 and in the reflecting light transmitting tube 31. Any number of factors may render the standardized calibration inaccurate. For example dirt may accumulate on the condenser or lenses 28, the value of light source 15 may change, the alignment of light source 15 with light source transmitting tube 30 may vary, or the photomultiplier B may increase or decrease in its effective amplification.

The principal embodiment of this invention incorporates a readily available light standard by passing light from light source transmitting tube 30 directly through reflected light transmitting tube 31 into the photomultiplier tube. The output of the photomultiplier is then adjusted such as by a biasing adjustment as indicated at 40 so that the output to the amplifier, as for example illustrated on meter 41, is at a standardized level. In such a case the adjustment of the photomultiplier will re-calibrate the device back to a standard regardless of what factor may cause the device to deviate from the fixed standard.

The light return device indicated generally at C comprises a solid plastic tube 45 made of a plastic, commonly sold under the trademark "Lucite," having the general characteristic of emitting light through only polished surfaces of the tube. The tube is bent in an arc and only the ends are polished. The light will be transmitted from one end of the tube to the other. Tube 45 is for protection contained within a copper tube 46. One end of the copper tube 46 is mounted by a conventional copper tube fitting 47 in axial alignment with an axis passing through target area 18 to the optical center of photomultiplier B. The polished end 49 of plastic tube 45 is arranged to face and emit light directly through target area B to the optical center of the photomultiplier. The opposite end of tube 45 is arranged with its polished face 50 directly facing in axial alignment with the focal point of light source 15 and through target area 18.

A shutter mechanism 55 is interposed between polished surface 50 and the light source within the optical system. The shutter mechanism comprises a light tight housing or box 56 having one open end 58 in the axis of light passage from light source 15 and through target area 18 and an opposite opening 59 disposed in alignment with the same axis and with aperture 58.

Two wheels or discs 60 and 61 are mounted within shutter area 55 which function to accomplish the full shutter functions of the device. Disc 60 is formed with a series of apertures indicated at 62, 63, 64 and 65. Disc 60 is mounted by an axle 66 so that the disc can rotate to register each of the various apertures 62 through 65 in registration with the light passing axis between apertures 58 and 59. The spaces between the apertures 62 through 65 when registered between the light passing apertures 58 and 59 completely obstruct light passage from the optical system to plastic tube 45.

Disc 60 is rotated by a relay driven ratchet mechanism generally indicated at 70. The ratchet mechanism for the particular disc 60 as shown contains eight discrete positions. One position aligns each of the apertures to allow transmission of light from the optical system to the light transmitting tube 45 and four positions each allow for the aligning of the disc for the stoppage of any light transmitted to plastic tube 45.

The other disc 61 is provided with a narrow slot 73 and disc 61 is mounted by an axle 75 in such a way that slot 73 will pass by the axis of opening between apertures 58 and 59. Wheel or disc 61 is rotated by a motor 78 so that the disc will rotate at a predetermined fixed speed such as for example 30 or 60 r.p.m.

The purpose of disk 61 is to provide pulses of light at predetermined intervals when disk 60 is in such a registration as to allow light passage through the shutter. This provides a pulse output from the photomultiplier such as indicated in FIG. 3 in which distinct pulses 80 are emitted each time the slot 73 passes the light passing aperture. The pulse information is much easier to utilize in devices of this type than would be a constant light source. Thus the shutter mechanism is able to supply pulses of selected predetermined intensity values (by the selection of the proper fixed apertures 62 to 65) and to provide a pulsating characteristic for the light by virtue of the rotating slot 73. Complete light blockage, of course, is effected when wheel 60 is in the intermediate position. To utilize the device shutter 55 is placed in the off position and the particle counter is set up in the conventional manner. Material having known particle size is then fed through target area 18 which provides an output having a known reference to the particle sizes passed through the target area. Meter 41 is then connected to read the output from photomultiplier B to amplifier 25 by operating switch 81 to make contact of the meter to the amplifier. Switch 81 also alternatively can connect the meter to the output of the computer for more details calibration which will be hereinafter described.

Ratchet 70 is then actuated to cause one of the apertures 62 through 65 to register in light transmitting relationship to tube 45. Motor 78 is then energized wherein the pulse output of pulses 80 is derived from the photomultiplier due to the pulsating light transmission through tube 45 directly into the receiving end of the photomultiplier.

The reading of meter 41 is then noted. This meter reading is thereafter in direct correlation to the standard particle size tested in target area 18. Thereafter all that need be done to establish a right reference to the tested particle size is to position the right aperture 62 in light transmitting realtionship and to rotate disk 61 and adjust meter 41 to the predetermined reading. This may be done, of course, by changing the bias through rheostat 40 to the photomultiplier.

A mechanical linkage such as suggested diagrammatically by dotted lines 83 may be used interconnecting the meter with the rheostat so that the linkage will act as a servo mechanism automatically bringing the photomultiplier into an adjustment to obtain the required meter reading. Such mechanisms are well known in the art and need not be described.

The device may conveniently be used for other calibrations by actuating switch 81 to take the output from computer 26. Such output may, for example, be indicative of different particle sizes. As previously noted, disk 60 is provided with apertures of varying sizes. Such apertures may be correlated directly with particle sizes within given ranges. In such case a standard for the various particle sizes can be created by merely positioning the right aperture in light transmitting relationship, establishing a standard reading on meter 41 and thereafter adjusting the output or control characteristics of computer 26 so as to be consistent with the predetermined standard indicated by the meter.

It can be seen that the essence of this invention is to establish a light standard which may be manually or automatically actuated so as to obtain a standard pulse output which may be directly correlated to a known standard. The signal output will be the same regardless of where a variation in the system might occur whether it be light source, light transmission or electronic amplification in the photomultiplier.

It can also be seen that the device can be calibrated from a signal output near the output of the device even after the computer computation wherein any deviation in the system can be compensated for to calibrate the device back to the standard.

Although the foregoing invention has been described in some detail by way of illustration and example for purposes of clarity of understanding, it is to be understood that certain changes and modifications may be practiced within the spirit of the invention as limited only by the scope of the appended claims.

What is claimed:

1. A device for calibrating an optical device of the type having a light beam focused on a target area and having an electrically reactive light sensing device arranged to sense light reflected from objects within the target area in which the path of a light axis from the reflected object to the light sensing device is at an angle other than in axial alignment with the light beam comprising light receiving means located in axial alignment with the light beam on the opposite side of the target area, means operably connected to transmit light from said light receiving means into axial alignment with said target area and said light sensing means such that light entering said light receiving means is directly transmitted through the target area to said light sensing means in direct proportion to the light received by said light receiving means.

2. A device for calibrating an optical device of the type having a light beam focused on a target area and having an electrically reactive light sensing device arranged to sense light reflected from objects within the target area in which the path of light from the reflected object to the light sensing device is at an angle other than in axial alignment with the light beam comprising light receiving means located in axial alignment with the light beam on the opposite side of the target area, means operably connected to transmit light from said light receiving means into actual alignment with said target area and said light sensing means such that light entering said light receiving means is directly transmitted through the target area to said light sensing means in direct proportion to the light received by said light receiving means, said means to transmit light comprising a tube formed of material having the characteristic of emitting light on the polished surfaces and transmitting light through the body of the material through all areas not bounded by a polished surface and in which the light receiving means is one polished end of said light transmitting tube and the light emitting means is another polished end of said light transmitting tube.

3. A device according to claim 2 and wherein said light transmitting tube is enclosed in a sealed tube.

4. A device for calibrating an optical device of the type having a light beam focused on a target area and having an electrically reactive light sensing device arranged to sense light reflected from objects within the target area in which the path of light axis from the reflected object to the light sensing device is at an angle other than in axial alignment with the light beam comprising light receiving means located in axial alignment with the light beam on the opposite side of the target area, means operably connected to transmit light from said light receiving means into axial alignment with said target area and said light sensing means such that light entering said light receiving means is directly transmitted through the target area to said light sensing means in direct proportion to the light received by said light receiving means, and shutter means interposed over one of said light receiving means and said light emitting means.

5. A device for calibrating an optical device of the type having a light beam focused on a target area and having an electrically reactive light sensing device arranged to sense light reflected from objects within the target area in which the path of light axis from the reflected object to the light sensing device is at an angle other than in axial alignment with the light beam comprising light receiving means located in axial alignment with the light beam on the opposite side of the target area, means operably connected to transmit light from said light receiving means into axial alignment with said light sensing means such that light entering said light receiving means is directly transmitted through the target area to said light sensing means in direct proportion to the light received by said light receiving means, shutter means interposed in the path of said light receiving means and said light transmitting means, and means to operate said shutter means to cause said shutter means to be alternatively in a light passing and a complete light blocking condition.

6. A device for calibrating an optical device of the type having a light beam focused on a target area and having an electrically reactive light sensing device arranged to sense light reflected from objects within the target area in which the path of light from the reflected object to the light sensing device is at an angle other than in axial alignment with the light beam comprising light receiving means located in axial alignment with the light beam on the opposite side of the target area, means operably connected to transmit light from said light receiving means into axial alignment with said target area and said light sensing means such that light entering said light receiving means is directly transmitted through the target area to said light sensing means in direct proportion to the light received by said light receiving means, shutter means interposed between said light receiving means and the light beam having a first disc having an apertured portion and a non-apertured portion, means to rotate said disc to register the apertured portion in registration with said light receiving means and alternatively register the non-apertured portion of said disc with said light receiving means, a second disc having an apertured slot, and means to continuously rotate said disc to pass the slot past said light receiving means.

7. A device according to claim 6, and wherein there is at least two apertures in said first disc, each aperture being formed of a different size.

8. A device for calibrating an optical device of the type having a light beam focused on a target area and having an electrically reactive light sensing device arranged to sense light reflected from objects within the light beam in which the path of light from the reflected object to the electrical sensing device is at an angle other than in axial alignment with the light beam comprising a light tight chamber enclosing the device, a first aperture formed in said chamber in axial alignment with the beam of light through the target area, a second aperture formed in said chamber in axial alignment through the target area and the light sensing device, a light tight shutter housing mounted over one of said apertures, said shutter housing having a first opening aligned directly over one of said apertures and a second opening located in axial alignment with the light beam passing through the one of said apertures, shutter means mounted within said shutter housing operative to alternatively open to allow light to pass from the first opening to the second opening and to close to completely block passage of light from the first opening to the second opening, and light transmitting means connected between the first and second apertures of said housing to transmit light from the first through the second aperture and to the light sensing means along the axis through the target area in direct proportion to the light received.

9. A device according to claim 8 and wherein said shutter means comprises a first disc having at least one aperture, and a second disc having at least one slot, means to rotate said first disc to align the aperture with the input and output openings of the shutter housing and operable to move to a second position to register the non-apertured portion of said disc to positions between the first and second openings of the housing, and means to rotate said second disc so that the slit periodically passes between the first and second openings of said housing.

References Cited in the file of this patent

UNITED STATES PATENTS

| | | |
|---|---|---|
| 2,783,390 | Mendenhall | Feb. 26, 1957 |
| 2,877,453 | Mendenhall | Mar. 10, 1959 |
| 2,962,926 | Marak et al. | Dec. 6, 1960 |